(12) United States Patent
Cheng et al.

(10) Patent No.: US 11,463,606 B2
(45) Date of Patent: Oct. 4, 2022

(54) FIXING APPARATUS AND METHOD OF SENSING SYSTEM

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Hao Xu, Beijing (CN); Feixiang Lu, Beijing (CN); Yajue Yang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/723,650

(22) Filed: Dec. 20, 2019

(65) Prior Publication Data
US 2020/0213483 A1 Jul. 2, 2020

(30) Foreign Application Priority Data
Dec. 26, 2018 (CN) .......................... 201811604231.8

(51) Int. Cl.
*H04N 5/225* (2006.01)
*E02F 3/43* (2006.01)
(Continued)

(52) U.S. Cl.
CPC ........... *H04N 5/2252* (2013.01); *E02F 3/434* (2013.01); *E02F 9/205* (2013.01); *E02F 9/26* (2013.01); *H04N 5/2257* (2013.01); *H04N 5/232* (2013.01)

(58) Field of Classification Search
CPC .... H04N 5/2252; H04N 5/2257; H04N 5/232; E02F 3/434; E02F 9/205; E02F 9/26; G05B 19/04
See application file for complete search history.

(56) References Cited

U.S. PATENT DOCUMENTS

| 6,019,607 A | 2/2000 | Jenkins et al. |
| 9,056,676 B1 * | 6/2015 | Wang ................. G01C 21/3697 |

(Continued)

FOREIGN PATENT DOCUMENTS

| CN | 103556901 A | 2/2014 |
| CN | 104884712 A | 9/2015 |

(Continued)

OTHER PUBLICATIONS

Chinese Patent Application No. 201811604231.8 Office Action dated Apr. 21, 2020, 7 pages.
(Continued)

*Primary Examiner* — Timothy J Henn
(74) *Attorney, Agent, or Firm* — Lathrop GPM LLP

(57) ABSTRACT

Embodiments of the present disclosure disclose an apparatus and method for fixing a sensing system to an unmanned construction machinery. The fixing apparatus includes an internal fixing module and an external fixing module, in which, the internal fixing module is configured to fix a sensing device in a sensing system of an unmanned construction machinery to the external fixing module in a predetermined fixing manner; and the external fixing module is configured to control the sensing device in the sensing system to perform an environment sensing on a target area of the unmanned construction machinery in a predetermined control manner.

9 Claims, 1 Drawing Sheet

(51) Int. Cl.
   *E02F 9/20* (2006.01)
   *E02F 9/26* (2006.01)
   *H04N 5/232* (2006.01)

(56) References Cited

U.S. PATENT DOCUMENTS

| | | | |
|---|---|---|---|
| 10,207,820 B2* | 2/2019 | Sullivan | B64C 39/024 |
| 2002/0107613 A1* | 8/2002 | Hopkins | G06T 1/0007 |
| | | | 700/269 |
| 2012/0083982 A1* | 4/2012 | Bonefas | G05D 1/0223 |
| | | | 701/70 |
| 2016/0364989 A1* | 12/2016 | Speasl | G08G 5/0082 |
| 2017/0038779 A1* | 2/2017 | Fujimori | B64C 39/024 |
| 2018/0009549 A1* | 1/2018 | Sullivan | B64C 39/024 |
| 2019/0263331 A1* | 8/2019 | Berne | B60R 11/04 |
| 2019/0337466 A1* | 11/2019 | Oba | H04N 5/2257 |
| 2020/0149248 A1* | 5/2020 | Ram-On | G05D 1/0088 |
| 2021/0155069 A1* | 5/2021 | Lazarevski | G08G 5/0069 |

FOREIGN PATENT DOCUMENTS

| | | |
|---|---|---|
| CN | 107511828 A | 12/2017 |
| CN | 208149311 U | 11/2018 |

OTHER PUBLICATIONS

Chinese Patent Application No. 201811604231.8 English translation of Office Action dated Apr. 21, 2020, 10 pages.

* cited by examiner

FIXING APPARATUS AND METHOD OF SENSING SYSTEM

CROSS-REFERENCE TO RELATED APPLICATION

The present application is based upon and claims priority to Chinese Patent Application No. 201811604231.8, filed on Dec. 26, 2018, the entire contents of which are incorporated herein by reference.

FIELD

Embodiments of the present disclosure relate to the field of computer application technology, and more particularly to a fixing apparatus of a sensing system and a fixing method of a sensing system.

BACKGROUND

With rapid development of the artificial intelligence (AI), an unmanned machinery construction with a plurality of functions may be implemented, thus improving security for construction and accuracy for controlling.

From the outside, the unmanned machinery construction is combined by a working apparatus, an upper turntable, a slewer and a running apparatus. The working apparatus is an apparatus where a machinery construction completes a digging task directly, and is spliced by a swing arm, a bucket rod and a shovel head. The slower controls the working apparatus and the upper turntable to be turned left or turned right. The running device is a device that moves the machinery construction forward, backward, or around a corner.

When the unmanned machinery construction is at work, the working apparatus, the upper turntable, the slewer and the running apparatus may be operated under the controlling of a control system. In general, a sensing system may be provided in the upper turntable, including a camera and an unmanned aerial vehicle. And a surrounding ambient of the unmanned machinery construction is sensed via the camera and the unmanned aerial vehicle, and a steering and a velocity of the unmanned machinery construction is controlled according to a sensed road, a sensed position, a sensed obstacle and the like, such that the unmanned machinery construction may drive at a construction site accurately and reliably. In the existing sensing system, the camera is merely fixed in the unmanned machinery construction via a sample connector while there is not a specific fixing apparatus for fixing the unmanned aerial vehicle in the unmanned machinery vehicle. Therefore, in the working process of the unmanned machinery construction, because there is not a specific fixing apparatus of the sensing system, a great influence may be caused in performance of the sensing system.

SUMMARY

Embodiments of the present disclosure provide a fixing apparatus and a fixing method of a sensing system.

Embodiments of the present disclosure provide a fixing apparatus of a sensing system. The fixing apparatus includes: an internal fixing module and an external fixing module. The internal fixing module is configured to fix a sensing device in a sensing system of an unmanned construction machinery to the external fixing module in a predetermined fixing manner. The external fixing module is configured to control the sensing device in the sensing system to perform an environment sensing on a target area of the unmanned construction machinery in a predetermined control manner.

Embodiments of the present disclosure provide a fixing method of a sensing system. The method includes: fixing a sensing device in a sensing system of an unmanned construction machinery to the unmanned construction machinery in a predetermined fixing manner; and controlling the sensing device in the sensing system to perform an environment sensing on a target area of the unmanned construction machinery in a predetermined control manner.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

Embodiment 1

Figure 1:
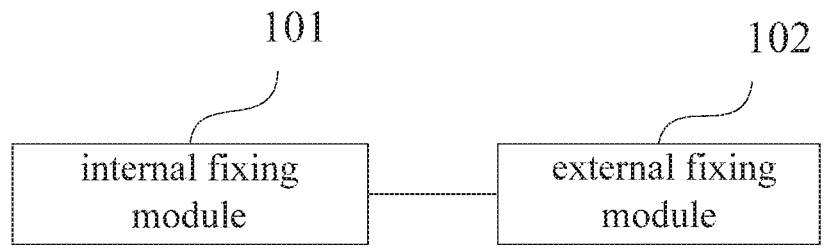
FIG. 1 is a block diagram illustrating a fixing apparatus of a sensing system provided by Embodiment 1 of the present disclosure.

FIG. 1 is a block diagram illustrating a fixing apparatus of a sensing system provided by Embodiment 1 of the present disclosure. As illustrated in FIG. 1, the fixing apparatus of a sensing system includes: an internal fixing module 101 and an external fixing module 102.

The internal fixing module 101 is configured to fix a sensing device in a sensing system of an unmanned construction machinery to the external fixing module in a predetermined fixing manner.

The external fixing module 102 is configured to control the sensing device in the sensing system to perform an environment sensing on a target area of the unmanned construction machinery in a predetermined control manner.

With the fixing apparatus of the sensing system provided in embodiments of the present disclosure, the internal fixing module fixes the sensing device in the sensing system of the unmanned construction machinery to the external fixing module in the predetermined fixing manner, and the external fixing module controls the sensing device in the sensing system to perform the environment sensing on the target area of the unmanned construction machinery in the predetermined control manner. However, in the existing sensing system, the camera is only fixed in the unmanned construction machinery directly via a simple connector while there is not a specific fixing apparatus to fix the camera in the unmanned construction machinery. Therefore, comparing with the related art, the fixing method of the sensing system provided by embodiments of the present disclosure may fix the sensing system in the unmanned construction machinery, such that stability and accuracy of the sensing system are improved, and the sensing system is easy to install and reliable to use. And the technical solution of embodiments of the present disclosure is easy to implement, convenient to popularize, and can be applied to a wide range of applications.

Embodiment 2

Figure 2:
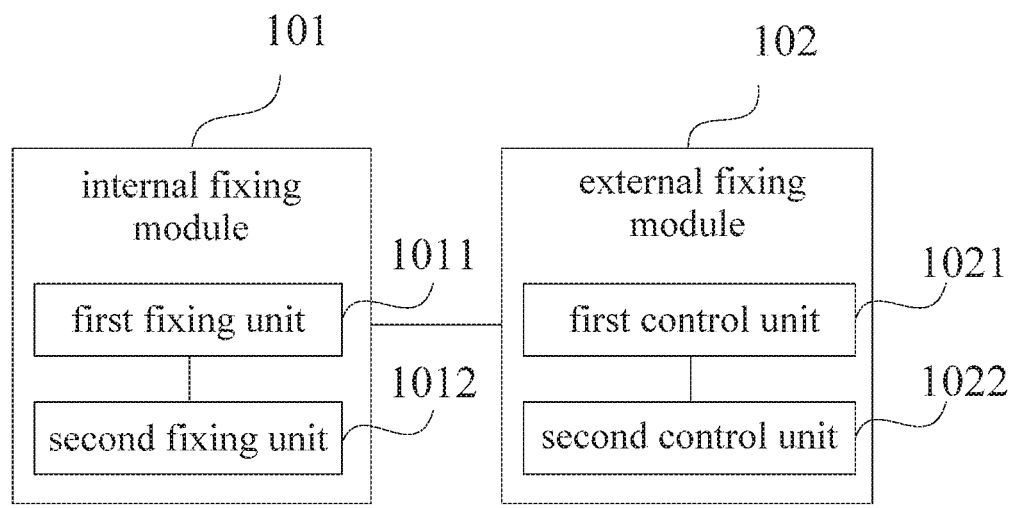
FIG. 2 is a block diagram illustrating a fixing apparatus of a sensing system provided by Embodiment 2 of the present disclosure.

FIG. 2 is a block diagram illustrating a fixing apparatus of a sensing system provided by Embodiment 2 of the present disclosure. As illustrated in FIG. 2, the fixing apparatus of a sensing system includes an internal fixing module 101. The internal fixing module includes a first fixing unit 1011 and a second fixing unit 1012.

The first fixing unit 1011 is configured to fix a first sensing device in the sensing system of the unmanned construction machinery to an external fixing module 102 in a predetermined first fixing manner.

The second fixing unit 1012 is configured to fix a second sensing device in the sensing system of the unmanned construction machinery to the external fixing module 102 in a predetermined second fixing manner.

Preferably, in detailed embodiments of the present disclosure, the external fixing module 102 includes a first control unit 1021 and a second control unit 1022.

The first control unit 1021 is configured to control the first sensing device in the sensing system to perform the environment sensing on a first sensing area of the unmanned construction machinery.

The second control unit 1022 is configured to control the second sensing device in the sensing system to perform the environment sensing on a second target area of the unmanned construction machinery.

Preferably, in detailed embodiments of the present disclosure, the first control unit 1021 includes a first perspective hole 1021a (not illustrated) and a second perspective hole 1021b (not illustrated). The first control unit 1021a is configured to control the first sensing device to perform the environment sensing on a front subregion of the first target area and a rear subregion of the first target area via the first perspective hole 1021a; and to control the first sensing device to perform the environment sensing on a left subregion of the first target area and a right subregion of the first target area via the second perspective hole 1021b.

Preferably, in detailed embodiments of the present disclosure, the second control unit 1022 includes a skylight controller 1022a (not illustrated) and a skylight opening-closing component 1022b (not illustrated). In an embodiment, the skylight opening-closing component herein may be implemented by a skylight switch. The skylight controller 1022a is configured to receive a control instruction sent by a control system of the unmanned construction machinery, and to send the control instruction to the skylight opening-closing component. The skylight opening-closing component 1022b is configured to receive the control instruction sent by the skylight controller, and to perform an opening or closing operation on a skylight of the unmanned construction machinery according to the control instruction. The control instruction includes a first control instruction or a second control instruction.

Preferably, in detailed embodiments of the present disclosure, the skylight opening-closing component 1022b is configured to control the skylight of the unmanned construction machinery to be opened when the control instruction sent by the skylight controller 1022a is the first control instruction; and to control the skylight of the unmanned construction machinery to be closed when the control instruction sent by the skylight controller is the second control instruction; or the skylight opening-closing component 1022b is configured to control the skylight of the unmanned construction machinery to be closed when the control instruction sent by the skylight controller 1022a is the first control instruction; and to control the skylight of the unmanned construction machinery to be opened when the control instruction sent by the skylight controller 1022a is the second control instruction.

Preferably, in detailed embodiments of the present disclosure, the first fixing unit 1011 includes: an accommodation component 1011a (not illustrated) and a latching component 1011b (not illustrated). The accommodation component 1011a is configured to package the first sensing component in the sensing system into an internal space of the accommodation component 1011a. In an embodiment, the accommodation component herein may be implemented by any container in which the camera in the sensing system is accommodated. The latching component 1011b is configured to fix the accommodation component to an internal space of the external fixing module 102. In an embodiment, the latching component herein may be implemented by any latch that fixes the container with the camera to the internal space of the external fixing module.

Preferably, in detailed embodiments of the present disclosure, the second fixing unit 1012 includes: a lifter 1012a (not illustrated) and a buffer 1012b (not illustrated); in which, the lifter 1012a is configured to lift the second sensing device in the sensing system to the highest point of the lifter through the buffer 1012b; or to drop the second sensing device in the sensing system to the lowest point of the lifter through the buffer 1012b. In an embodiment, the lifter herein may be implemented by a lift table on which the second sensing device is placed.

With the fixing apparatus of the sensing system provided in embodiments of the present disclosure, the internal fixing module fixes the sensing device in the sensing system of the unmanned construction machinery to the external fixing module in the predetermined fixing manner, and the external fixing module controls the sensing device in the sensing system to perform the environment sensing on the target area of the unmanned construction machinery in the predetermined control manner. However, in the existing sensing system, the camera is only fixed in the unmanned construction machinery directly via a simple connector while there is not a specific fixing apparatus to fix the camera in the unmanned construction machinery. Therefore, comparing with the related art, the fixing method of the sensing system provided by embodiments of the present disclosure may fix the sensing system in the unmanned construction machinery, such that stability and accuracy of the sensing system are improved, and the sensing system is easy to install and reliable to use. And the technical solution of embodiments of the present disclosure is easy to implement, convenient to popularize, and applied to a wide range.

Embodiment 3

Figure 3:
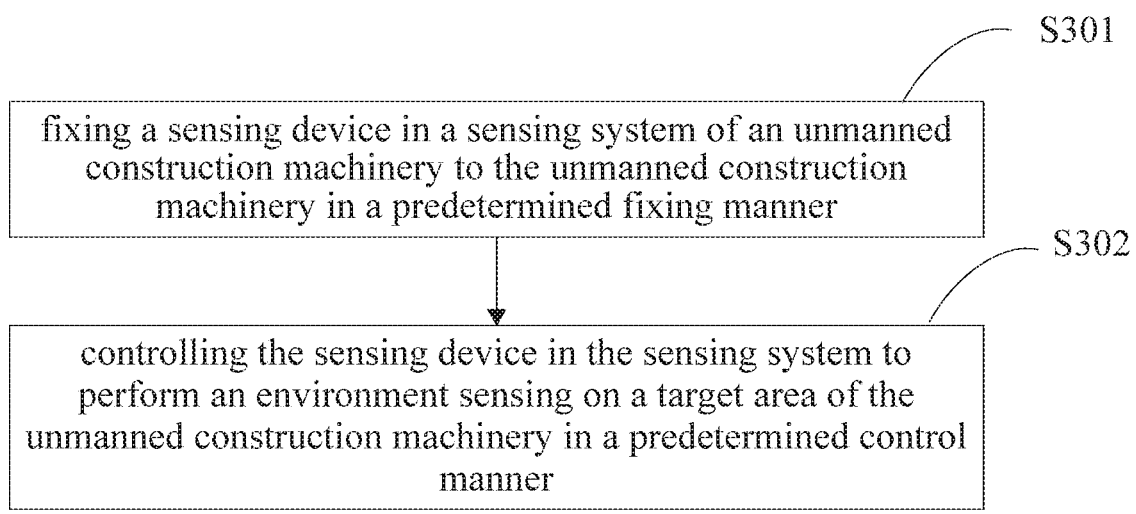
FIG. 3 is a flow chart illustrating a fixing method of a sensing system provided by Embodiment 3 of the present disclosure.

FIG. 3 is a flow chart illustrating a fixing method of a sensing system provided by Embodiment 3 of the present disclosure. As illustrated in FIG. 3, the fixing method of a sensing system may include actions at following blocks.

At block S301, a sensing device in a sensing system of an unmanned construction machinery is fixed to the unmanned construction machinery in a predetermined fixing manner.

In detailed embodiments of the present disclosure, a fixing apparatus may fix the sensing device in the sensing system of the unmanned construction machinery to the unmanned construction machinery in the predetermined fixing manner. The fixing apparatus includes: an internal fixing module and an external fixing module. The internal fixing module is configured to fix a sensing device in a sensing system of an unmanned construction machinery to the external fixing module in a predetermined fixing manner. The external fixing module is configured to control the sensing device in the sensing system to perform an environment sensing on a target area of the unmanned construction machinery in a predetermined control manner.

Preferably, in detailed embodiments of the present disclosure, the internal fixing module includes a first fixing unit and a second fixing unit. The first fixing unit is configured to fix a first sensing device in the sensing system of the unmanned construction machinery to an external fixing module in a predetermined first fixing manner. The second fixing unit is configured to fix a second sensing device in the sensing system of the unmanned construction machinery to the external fixing module in a predetermined second fixing manner.

Preferably, in detailed embodiments of the present disclosure, the external fixing module includes a first control unit and a second control unit. The first control unit is configured to control the first sensing device in the sensing system to perform the environment sensing on a first sensing area of the unmanned construction machinery. The second control unit is configured to control the second sensing device in the sensing system to perform the environment sensing on a second target area of the unmanned construction machinery.

Preferably, in detailed embodiments of the present disclosure, the first control unit includes a first perspective hole and a second perspective hole. The first control unit is configured to control the first sensing device to perform the environment sensing on a front subregion of the first target area and a rear subregion of the first target area via the first perspective hole; and to control the first sensing device to perform the environment sensing on a left subregion of the first target area and a right subregion of the first target area via the second perspective hole.

Preferably, in detailed embodiments of the present disclosure, the second control unit includes a skylight controller and a skylight opening-closing component. The skylight controller is configured to receive a control instruction sent by a control system of the unmanned construction machinery, and to send the control instruction to the skylight opening-closing component. The skylight opening-closing component is configured to receive the control instruction sent by the skylight controller, and to perform an opening or closing operation on a skylight of the unmanned construction machinery according to the control instruction. The control instruction includes a first control instruction or a second control instruction.

Preferably, in detailed embodiments of the present disclosure, the skylight opening-closing component is configured to control the skylight of the unmanned construction machinery to be opened when the control instruction sent by the skylight controller is the first control instruction; and to control the skylight of the unmanned construction machinery to be closed when the control instruction sent by the skylight controller is the second control instruction; or the skylight opening-closing component is configured to control the skylight of the unmanned construction machinery to be closed when the control instruction sent by the skylight controller is the first control instruction; and to control the skylight of the unmanned construction machinery to be opened when the control instruction sent by the skylight controller is the second control instruction.

Preferably, in detailed embodiments of the present disclosure, the first fixing unit includes: an accommodation component and a latching component. The accommodation component is configured to package the first sensing component in the sensing system into an internal space of the accommodation component. The latching component is configured to fix the accommodation component to an internal space of the external fixing module.

Preferably, in detailed embodiments of the present disclosure, the second fixing unit includes: a lifter and a buffer; in which, the lifter is configured to lift the second sensing device in the sensing system to the highest point of the lifter through the buffer; or to drop the second sensing device in the sensing system to the lowest point of the lifter through the buffer At block S302, the sensing device in the sensing system is controlled to perform an environment sensing on a target area of the unmanned construction machinery in a predetermined control manner.

In detailed embodiments, the fixing apparatus may receive a control instruction sent by the control system of the unmanned construction machinery, in which, the control instruction includes a first control instruction or a second control instruction; and control the sensing device in the sensing system to perform the environment sensing on the target area of the unmanned construction machinery based on the control instruction.

With the fixing method of the sensing system provided by embodiments of the present disclosure, the internal fixing module fixes the sensing device in the sensing system of the unmanned construction machinery to the external fixing module in the predetermined fixing manner, and the external fixing module controls the sensing device in the sensing system to perform the environment sensing on the target area of the unmanned construction machinery in the predetermined control manner. However, in the existing sensing system, the camera is only fixed in the unmanned construction machinery directly via a simple connector while there is not a specific fixing apparatus to fix the camera in the unmanned construction machinery. Therefore, comparing with the related art, the fixing method of the sensing system provided by embodiments of the present disclosure may fix the sensing system in the unmanned construction machinery, such that stability and accuracy of the sensing system are improved, and the sensing system is easy to install and reliable to use. And the technical solution of embodiments of the present disclosure is easy to implement, convenient to popularize, and applied to a wide range.

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. An apparatus for fixing a sensing system to an unmanned construction machinery, the sensing system including a camera and an unmanned aerial vehicle, the apparatus comprising:
    a package and a latch, configured to fix the camera in a predetermined first fixing manner to the unmanned construction machinery;
    a lift and a buffer, configured to fix the unmanned aerial vehicle in a predetermined second fixing manner to the unmanned construction machinery;
    a first controller configured to control the camera to perform an environment sensing on a first target area of the unmanned construction machinery; and
    a second controller configured to control the unmanned aerial vehicle to perform an environment sensing on a second target area of the unmanned construction machinery.

2. The apparatus of claim 1, further comprising a first perspective hole and a second perspective hole; and
    the first controller is configured to control the camera to perform the environment sensing on a front subregion of the first target area and a rear subregion of the first target area via the first perspective hole; and to control the camera to perform the environment sensing on a left subregion of the first target area and a right subregion of the first target area via the second perspective hole.

3. The apparatus of claim 1, wherein, the second controller comprises
    a skylight controller, configured to receive a control instruction sent by a control system of the unmanned construction machinery, wherein the control instruction comprises a first control instruction or a second control instruction for controlling a skylight of the unmanned construction machinery to be opened or closed.

4. The apparatus of claim 3, wherein, the skylight is opened in response to the first control instruction, and the skylight is closed in response to the second control instruction.

5. The apparatus of claim 3, wherein, the skylight is opened in response to the second control instruction, and the skylight is closed in response to the first control instruction.

6. The apparatus of claim 1, wherein the package is configured to package the camera in the sensing system into an internal space of the package; and
    the latch is configured to fix the packaged camera to the unmanned construction machinery.

7. The apparatus of claim 1, wherein
    the lift is configured to perform at least one of acts of:
        lifting the unmanned aerial vehicle in the sensing system to the highest point of the lift table through the buffer; and dropping the unmanned aerial vehicle in the sensing system to the lowest point of the lift table through the buffer.

8. A method for fixing a sensing system to an unmanned construction machinery, the sensing system including a camera and an unmanned aerial vehicle, the method comprising:
    fixing by a package and a latch, the camera in a predetermined first fixing manner to the unmanned construction machinery;
    fixing by a lift and a buffer, the unmanned aerial vehicle in a predetermined second fixing manner to the unmanned construction machinery;
    controlling the camera to perform an environment sensing on a first target area of the unmanned construction machinery; and
    controlling the unmanned aerial vehicle to perform an environment sensing on a second target area of the unmanned construction machinery.

9. The method of claim 8, wherein, controlling the camera and the unmanned aerial vehicle in the sensing system to perform the environment sensing comprises:
    receiving a control instruction sent by a control system of the unmanned construction machinery, the control instruction comprising a first control instruction or a second control instruction;
    controlling the camera in the sensing system to perform the environment sensing on the first target area of the unmanned construction machinery based on the control instruction; and
    controlling the unmanned aerial vehicle in the sensing system to perform the environment sensing on the second target area of the unmanned construction machinery based on the control instruction.

* * * * *